US010741316B2

(12) United States Patent
Skårman et al.

(10) Patent No.: US 10,741,316 B2

(45) Date of Patent: Aug. 11, 2020

(54) FERROMAGNETIC POWDER COMPOSITION AND METHOD FOR ITS PRODUCTION

(75) Inventors: Björn Skårman, Höganäs (SE); Zhou Ye, Lerberget (SE)

(73) Assignee: HÖGANÄS AB (PUBL), Höganäs (SE)

( * ) Notice: Subject to any disclaimer, the term of this patent is extended or adjusted under 35 U.S.C. 154(b) by 404 days.

(21) Appl. No.: 13/578,786

(22) PCT Filed: Feb. 9, 2011

(86) PCT No.: PCT/EP2011/051877

§ 371 (c)(1),
(2), (4) Date: Sep. 19, 2012

(87) PCT Pub. No.: WO2011/101276

PCT Pub. Date: Aug. 25, 2011

(65) Prior Publication Data

US 2013/0015394 A1 Jan. 17, 2013

Related U.S. Application Data

(60) Provisional application No. 61/305,772, filed on Feb. 18, 2010.

(30) Foreign Application Priority Data

Feb. 18, 2010 (SE) ........................................ 1050154

(51) Int. Cl.

| | |
|---|---|
| ***H01F 1/20*** | (2006.01) |
| ***H01F 1/24*** | (2006.01) |
| ***C04B 35/26*** | (2006.01) |
| ***H01F 1/33*** | (2006.01) |
| ***B22F 1/02*** | (2006.01) |
| ***H01F 41/02*** | (2006.01) |
| ***H01F 1/26*** | (2006.01) |

(52) U.S. Cl.

CPC .................. *H01F 1/24* (2013.01); *B22F 1/02* (2013.01); *H01F 1/26* (2013.01); *H01F 41/0246* (2013.01); *B22F 2998/10* (2013.01); *C22C 2202/02* (2013.01)

(58) Field of Classification Search

None

See application file for complete search history.

(56) References Cited

U.S. PATENT DOCUMENTS

| | | | | |
|---|---|---|---|---|
| 4,601,765 A | 7/1986 | Soileau et al. | | |
| 5,066,720 A * | 11/1991 | Ohsugi et al. | 525/100 | |
| 6,149,704 A | 11/2000 | Moro et al. | | |
| 6,309,748 B1 | 10/2001 | Lashmore et al. | | |
| 6,348,265 B1 | 2/2002 | Jansson et al. | | |
| 7,153,594 B2 | 12/2006 | Kejzelman et al. | | |
| 7,235,208 B2 | 6/2007 | Moro | | |
| 2002/0073803 A1* | 6/2002 | Narasimhan et al. | 75/252 | |
| 2002/0108468 A1* | 8/2002 | Uenosono | 75/252 | |
| 2003/0127157 A1* | 7/2003 | Iyoda et al. | 148/104 | |
| 2004/0126609 A1 | 7/2004 | Ueta et al. | | |
| 2004/0191519 A1* | 9/2004 | Kejzelman | B22F 1/0059 428/407 | |
| 2006/0147177 A1* | 7/2006 | Jing et al. | 385/147 | |
| 2006/0214138 A1* | 9/2006 | Ye et al. | 252/500 | |
| 2007/0132113 A1* | 6/2007 | Hinterman | 257/791 | |
| 2008/0044679 A1 | 2/2008 | Maeda et al. | | |
| 2008/0277925 A1* | 11/2008 | Goto | C10M 103/00 285/94 | |
| 2010/0316447 A1* | 12/2010 | Schmidt | C04B 12/04 405/128.75 | |
| 2011/0006246 A1 | 1/2011 | Skårman et al. | | |

FOREIGN PATENT DOCUMENTS

| | | |
|---|---|---|
| EP | 1 928 002 A1 | 6/2008 |
| JP | 2006-024869 A | 1/2006 |
| JP | 2006-233295 A | 9/2006 |
| JP | 2006-245183 A | 9/2006 |
| JP | 2007-88156 A | 4/2007 |
| JP | 2007-129154 A | 5/2007 |
| WO | WO 2004/056508 A1 | 7/2004 |
| WO | WO 2009/116938 A1 | 9/2009 |

OTHER PUBLICATIONS

*International Search Report (PCT/ISA/210) dated Mar. 3, 2011, by the European Patent Office as the International Searching Authority for International Application No. PCT/EP2011/051877.

*Written Opinion (PCT/ISA/237) dated Mar. 3, 2011, by the European Patent Office as the International Searching Authority for International Application No. PCT/EP2011/051877.

* cited by examiner

*Primary Examiner* — Ronak C Patel

(74) *Attorney, Agent, or Firm* — Buchanan Ingersoll & Rooney P.C.

(57) ABSTRACT

A ferromagnetic powder composition including soft magnetic iron-based core particles, wherein the surface of the core particles is provided with at least one phosphorus-based inorganic insulating layer and then at least partially covered with metal-organic compound(s), wherein the total amount of metal-organic compound(s) is between 0.005 and 0.05% by weight of the powder composition, and wherein the powder composition further includes a lubricant. Further, a process for producing the composition and a method for the manufacturing of soft magnetic composite components prepared from the composition, as well as the obtained component.

14 Claims, No Drawings

FERROMAGNETIC POWDER COMPOSITION AND METHOD FOR ITS PRODUCTION

FIELD OF THE INVENTION

The present invention relates to a powder composition comprising an electrically insulated iron-based powder and to a process for producing the same. The invention further concerns a method for the manufacturing of soft magnetic composite components prepared from the composition, as well as the obtained component.

BACKGROUND OF THE INVENTION

Soft magnetic materials are used for applications, such as core materials in inductors, stators and rotors for electrical machines, actuators, sensors and transformer cores. Traditionally, soft magnetic cores, such as rotors and stators in electric machines, are made of stacked steel laminates. Soft Magnetic Composite (SMC) materials are based on soft magnetic particles, usually iron-based, with an electrically insulating coating on each particle. The SMC components are obtained by compacting the insulated particles using a traditional powder metallurgical (PM) compaction process, optionally together with lubricants and/or binders. By using the powder metallurgical technique it is possible to produce materials having higher degree of freedom in the design of the SMC component than by using the steel laminates, as the SMC material can carry a three dimensional magnetic flux, and as three dimensional shapes can be obtained by the compaction process.

Two key characteristics of an iron core component are its magnetic permeability and core loss characteristics. The magnetic permeability of a material is an indication of its ability to become magnetized or its ability to carry a magnetic flux. Permeability is defined as the ratio of the induced magnetic flux to the magnetizing force or field intensity. When a magnetic material is exposed to a varying field, energy losses occur due to both hysteresis losses and eddy current losses. The hysteresis loss (DC-loss), which constitutes the majority of the total core losses in most motor applications, is brought about by the necessary expenditure of energy to overcome the retained magnetic forces within the iron core component. The forces can be minimized by improving the base powder purity and quality, but most importantly by increasing the temperature and/or time of the heat treatment (i.e. stress release) of the component. The eddy current loss (AC-loss) is brought about by the production of electric currents in the iron core component due to the changing flux caused by alternating current (AC) conditions. A high electrical resistivity of the component is desirable in order to minimise the eddy currents. The level of electrical resistivity that is required to minimize the AC losses is dependent on the type of application (operating frequency) and the component size.

The hysteresis loss is proportional to the frequency of the alternating electrical fields, whereas the eddy current loss is proportional to the square of the frequency. Thus, at high frequencies, the eddy current loss matters mostly and it is especially required to reduce the eddy current loss and still maintaining a low level of hysteresis loss. For applications operating at high frequencies where insulated soft magnetic powders are used, it is desirable to use powders having finer particle size, as the eddy currents created can be restricted to a smaller volume provided the electrical insulation of the individual powder particles is sufficient (inner-particle Eddy currents). Thus, fine powders as well as high electrical resistivity will become more important for components working at high frequency. Independent on how well the particle insulation works, there is always a part of unrestricted Eddy currents within the bulk of the component, causing loss. The bulk Eddy-current loss is proportional to the cross sectional area of the compacted part that carries magnetic flux. Thus, components having large cross sectional area that carry magnetic flux will require higher electrical resistivity in order to restrict the bulk Eddy current losses.

Insulated iron-based soft magnetic powder having an average particle size of 10-600 μm, e.g. 100-400 μm. An average particle size of between about 180 μm and 250 μm and less than 10% of the particles having a particle size below 45 μm (40 mesh powder) are normally used for components working at a frequency up to 1 kHz. Powders having an average particle size of 50-150 μm, e.g. between about 80 μm and 120 μm and 10-30% less than 45 μm (100 mesh powder) may be used for components working from 200 Hz up to 10 kHz, whereas components working at frequencies from 2 kHz up to 50 kHz are normally based on insulated soft magnetic powders having an average particle size about 20-75 μm, e.g. between about 30 μm and 50 μm and more than 40% is less than 45 μm (200 mesh powder). The average particle size and particle size distribution should preferably be optimized according to the requirements of the application. Thus examples of weight average particle sizes are 10-450 μm, 20-400 μm, 20-350 μm, 30-350 μm, 30-300 μm, 20-80 μm, 30-50 μm, 50-150 μm, 80-120 μm, 100-400 μm, 150-350 μm, 180-250 μm, 120-200 μm.

For certain special applications finer particle sizes are preferred. In these applications preferable weight average particle sizes are 10-50 μm and about 90% by weight of the powder is usually below 75 μm.

Research in the powder-metallurgical manufacture of magnetic core components using coated iron-based powders has been directed to the development of iron powder compositions that enhance certain physical and magnetic properties without detrimentally affecting other properties of the final component. Desired component properties include e.g. high permeability through an extended frequency range, low core losses, high saturation induction, and high mechanical strength. The desired powder properties further include suitability for compression molding techniques, which means that the powder can be easily molded to a high density component, which can be easily ejected from the molding equipment without damages on the component surface.

U.S. Pat. No. 6,309,748 to Lashmore describes a ferromagnetic powder having a diameter size of from about 40 to about 600 microns and a coating of inorganic oxides disposed on each particle.

U.S. Pat. No. 6,348,265 to Jansson teaches an iron powder coated with a thin phosphorous and oxygen containing coating, the coated powder being suitable for compaction into soft magnetic cores which may be heat treated.

U.S. Pat. No. 4,601,765 to Soileau teaches a compacted iron core which utilizes iron powder which first is coated with a film of an alkali metal silicate and then over-coated with a silicone resin polymer.

U.S. Pat. No. 6,149,704 to Moro describes a ferromagnetic powder electrically insulated with a coating of a phenol resin and/or silicone resin and optionally a sol of titanium oxide or zirconium oxide. The obtained powder is mixed with a metal stearate lubricant and compacted into a dust core.

U.S. Pat. No. 7,153,594 to Kejzelman et al. teaches about a ferromagnetic powder composition comprising soft magnetic iron-based core particles and a lubricating amount of a compound selected from the group consisting of silanes, titanates, aluminates, zirconates or mixtures thereof.

U.S. Pat. No. 7,235,208 to Moro teaches a dust core made of ferromagnetic powder having an insulating binder in which the ferromagnetic powder is dispersed, wherein the insulating binder comprises a trifunctional alkyl-phenyl silicone resin and optionally an inorganic oxide, carbide or nitride.

The patent application PCT/SE2009/050278 teaches about a ferromagnetic powder composition comprising soft magnetic iron-based core particles, wherein the surface of the core particles is provided with a first inorganic insulating layer and at least one metal-organic layer, located outside the first layer, of a metal-organic compound having the following general formula $R_1[(R_1)_x(R_2)_y(MO_{n-1})]_nR_1$, and wherein a metallic or semi-metallic particulate compound having a Mohs hardness of less than 3.5 being adhered to the at least one metal-organic layer; and wherein the powder composition further comprises a particulate lubricant.

Further documents within the field of soft-magnetics are Japanese patent application JP 2005-322489, having the publication number JP 2007-129154, to Yuuichi; Japanese patent application JP 2005-274124, having the publication number JP 2007-088156, to Maeda; Japanese patent application JP 2004-203969, having the publication no JP 2006-0244869, to Masaki; Japanese patent application 2005-051149, having the publication no 2006-233295, to Ueda and Japanese patent application 2005-057193, having the publication no 2006-245183, to Watanabe.

There is an ongoing need for yet improved performances of soft magnetic powder compositions, such as e.g. improved core loss characteristics and resistivity. Thus, it would be very desirable to find products and processes that increases performances of soft magnetic powder compositions.

SUMMARY OF THE INVENTION

The present invention relates to a ferromagnetic powder composition comprising soft magnetic iron-based core particles, wherein the surface of the core particles is provided with at least one phosphorus-based inorganic insulating layer and then at least partially covered with metal-organic compound(s), wherein the total amount of metal-organic compound(s) is between 0.005 and 0.05% by weight of the powder composition, and at least one metal-organic compound is hydrolysable and is selected from alkyl alkoxy silanes, alkyl alkoxy (poly)siloxanes, alkyl alkoxy silsesquioxanes, or the corresponding compounds wherein the central metallic atom of the hydrolysable metal-organic compound instead constitute of Ti, Al, or Zr; and wherein the powder composition further comprises a lubricant.

The phosphorous-based inorganic insulating layer is fully or partially covered with at least one hydrolysable metal-organic compound, preferably in liquid form. The total amount of added metal-organic compound(s) should preferably be below 0.05% by weight of the composition.

The powder composition also comprises a lubricant. The lubricant is added to the composition comprising the core particles provided with at least one phosphorous-based inorganic insulating layer, partially or fully covered with at least one hydrolysable metal-organic compound, preferably in liquid form.

The invention further concerns a process for the preparation of soft magnetic composite materials comprising: uniaxially compacting a composition according to the invention in a die at a compaction pressure of at least about 600 MPa; optionally pre-heating the die, e.g. pre-heating the die to a temperature below the melting temperature of the added particulate lubricant; ejecting the obtained green body; and optionally heat-treating the body. A composite component according to the invention will typically have a content of phosphorous (P) of about 0.01-0.15% by weight, and a content of an added metallic element chosen from the group of Si, Ti, Zr, Al to the base powder of about 0.001-0.03% by weight of the component.

In one embodiment of the present invention an iron-based powder composition comprising an electrically insulated iron-based powder can be compacted into soft magnetic components with high resistivity and low core loss.

In another embodiment of the invention an iron-based powder composition, comprising an electrically insulated iron-based powder, can be compacted into soft magnetic components having high strength, which component can be heat treated at an optimal heat treatment temperature without the electrically insulated coating of the iron-based powder being unacceptably deteriorated.

In yet another embodiment of the invention, an iron-based powder composition comprising an electrically insulated iron-based powder, can be compacted into soft magnetic components using minimal addition of lubricants while maintaining the ejection behavior at an acceptable level.

In yet another embodiment of the invention, an iron-based powder composition comprising an electrically insulated iron-based powder, can be compacted into soft magnetic components having high strength, high maximum permeability, and high induction while minimizing hysteresis loss while Eddy current loss are kept at a low level.

In yet another embodiment of the invention, a method for producing the iron-based powder composition is provided, comprising an electrically insulated iron-based powder, with acceptable powder properties as measured by for example Hall flow.

In yet another embodiment of the invention, a method for producing the iron-based powder composition is provided, comprising an electrically insulated iron-based powder, without the need for any toxic or environmentally unfavorable solvents or drying procedures.

In yet another embodiment of the invention, a process is provided wherein an iron-based powder composition, comprising an electrically insulated iron-based powder, can be compacted into soft magnetic components using minimal addition of additives to improve ejection behavior as well as electrical resistivity of the compacted soft magnetic composite component.

In yet another embodiment of the invention, a process for producing a compacted, and optionally heat treated, soft magnetic iron-based composite component having low core loss in combination with sufficient mechanical strength and acceptable magnetic flux density (induction) and maximal permeability is provided.

In yet another embodiment of the invention, a method for producing compacted and heat treated soft magnetic components having high strength, high maximum permeability, high induction, and low core loss, obtained by minimizing hysteresis loss while keeping Eddy current loss at a low level, is provided.

DETAILED DESCRIPTION OF THE INVENTION

Base Powder

The iron-based soft magnetic core particles may be of a water atomized, a gas atomized or a sponge iron powder, although a water atomized powder is preferred.

The iron-based soft magnetic core particles may be selected from the group consisting of essentially pure iron, alloyed iron Fe—Si having up to 7% by weight, preferably up to 3% by weight of silicon, alloyed iron selected from the groups Fe—Al, Fe—Si—Al, Fe—Ni, Fe—Ni—Co, or combinations thereof. Essentially pure iron is preferred, i.e. iron with inevitable impurities.

The particles may be spherical or irregular shaped, but irregular shaped particles are preferred. The apparent density (AD) may be between 2.8 and 4.0 $g/cm^3$, preferably between 3.1 and 3.7 $g/cm^3$.

Insulated iron-based soft magnetic powder having an average particle size of 100-400 μm, e.g. between about 180 μm and 250 μm and less than 10% of the particles having a particle size below 45 μm (40 mesh powder) are normally used for components working at a frequency up to 1 kHz. Powders having an average particle size of 50-150 μm, e.g. between about 80 μm and 120 μm and 10-30% less than 45 μm (100 mesh powder) may be used for components working from 200 Hz up to 10 kHz, whereas components working at frequencies from 2 kHz up to 50 kHz are normally based on insulated soft magnetic powders having an average particle size about 20-75 μm, e.g. between about 30 μm and 50 μm and more than 40% is less than 45 μm (200 mesh powder). The average particle size and particle size distribution should preferably be optimized according to the requirements. Thus, examples of weight average particle sizes are 10-450 μm, 20-400 μm, 20-350 μm, 30-350 μm, 30-300 μm, 20-80 μm, 30-50 μm, 50-150 μm, 80-120 μm, 100-400 μm, 150-350 μm, 180-250 μm, 120-200 μm. However, for certain high frequency applications finer particle sizes are preferred. In these applications preferable weight average particle sizes are 10-50 μm.

Inorganic Coating Layer

The core particles are provided with a first inorganic insulating layer, which preferably is phosphorous-based. This first coating layer may be achieved by treating iron-based powder with phosphoric acid solved in either water or organic solvents. In water-based solvent rust inhibitors and tensides are optionally added. A preferred method of coating the iron-based powder particles is described in U.S. Pat. No. 6,348,265. The phosphatizing treatment may be repeated. The phosphorous based insulating inorganic coating of the iron-based core particles is preferably without any additions such as dopants, rust inhibitors, or surfactants.

The content of phosphorous in the layer may be between 0.01 and 0.15 wt % of the composition.

Addition of the Hydrolysable Metal-Organic Compound

Any addition of liquids or solids into the iron-based powder composition results in more complicated and expensive processing or worse soft magnetic performance of the final composite material. It is therefore of great interest to minimize the weight or volume of any addition.

The length, size, and chemical functionality of the organic part of the hydrolysable metal-organic compounds can be used to control the hydrophobicity or wetting character, as well as the viscosity of the compound. Thus, preferred hydrolysable metal-organic compounds according to the present invention are those that show low viscosity and an extraordinary high wettability towards the iron-based powders described herein.

The phosphorous-based inorganic insulating layer is fully or partially covered with at least one hydrolysable metal-organic compound. The metal-organic hydrolysable compound may be selected from the following groups: surface modifiers, coupling agents, or cross-linking agents. The hydrolysable metal-organic compound may be selected from silanes, siloxanes and silsesquioxanes, wherein the central atom consists of Si, or the corresponding compounds wherein the central atom consist of Ti, Al or Zr, or mixtures thereof. The compound can be derivates, intermediates or oligomers thereof. The most preferred compounds are found in the groups polysiloxanes and silsesquioxanes, wherein O/Si ratio is higher than 1, i.e. $(Si—Ox)n$ wherein $x>1$, preferably $x>1.5$, and n is greater than 2.

In comparison with hydrolysable metal-organic compounds, non-hydrolysable metal-organic compounds result in poor powder properties, such as Hall flow rate. Therefore, hydrolysable compounds are preferred. However, metal-organic compounds that are not hydrolysable may be added in combination with hydrolysable compound(s). Thus, the phosphorous-based inorganic insulating layer may be fully or partially covered with a mixture of at least one hydrolysable metal-organic compound and at least one metal-organic compound which is not hydrolysable, in solid or liquid form, preferably in liquid form. The group of silsesquioxanes comprises also only hydrogen substituted silsesquioxanes, only aryl substituted silsesquioxanes or only alkyl substituted silsesquioxanes without any hydrolysable groups. In these cases the silsesquioxanes can be dissolved in hydrolysable compounds, such as alkylated or arylated alkoxy polysiloxanes, alkylated or arylated alkoxy oligosiloxanes, or alkylated or arylated alkoxy silanes. Formulations pre-hydrolyzed in e.g. aqueous solutions are also within the scope of present invention.

The hydrolysable group is preferably chosen from an alkoxy group having less than 4, preferably less than 3 carbon atoms, such as methoxy, ethoxy, propoxy, or acetoxy groups.

Optionally the hydrolysable metal-organic compound may include at least one organic part, or portion, that gives an improved surface adhesion or reaction. The organic part may thus also comprise one or more functional groups chosen from the chemical classes amine, ammonium, amide, imine, imide, azide, ureido, urethane, cyanate, isocyanate, nitrate, nitrite, benzyl amine, vinyl benzyl amine. Also classes such as epoxy, acrylate, methacrylate, phenyl, vinyl, mercapto, sulfur, sulfide may optionally be included. Preferably may at least one organic part comprise at least one group containing nitrogen. More preferably may at least one organic part comprise at least one amino group.

The most preferred hydrolysable compounds may be selected from alkyl alkoxy silanes, alkyl alkoxy (poly) siloxanes, alkyl alkoxy silsesquioxanes, aryl alkoxy silanes, aryl alkoxy (poly)siloxanes, and aryl alkoxy silsesquioxanes. The alkyl alkoxy polysiloxanes and aryl alkoxy polysiloxanes may be alkyl alkoxy oligosiloxanes and aryl alkoxy oligosiloxanes, respectively. Other metal-organic compounds like hydrogen silsesquioxanes, aryl silsesquioxanes and/or alkyl silsesquioxanes may also be used, provided that they are combined with hydrolysable compounds. The alkyl or aryl groups of the mentioned compounds preferably comprises at least one amino-functionality. Without being bound to any specific theory it is believed that non-hydrolysable metal-organic compounds, specially silsesquioxanes, may improve the electrical resistivity of the final component, even if added in such small amounts as in the present invention. The amount of added non-hydrolysable metal-organic compound(s) should constitute less than 95% by weight, preferably less than 80% by weight, of the total amount of added metal-organic compound(s).

If the metal-organic compound is a monomer, it may be selected from the group of trialkoxy and dialkoxy silanes, titanates, aluminates, or zirconates. The monomer of the metal-organic compound may thus be selected from 3-aminopropyl-trimethoxysilane, 3-aminopropyl-triethoxysilane, 3-aminopropyl-methyl-diethoxysilane, N-aminoethyl-3-aminopropyl-trimethoxysilane, N-(n-butyl)-3-aminopropyl-trimethoxysilane, N-phenyl-3-aminopropyl-trimethoxysilane, N-aminoethyl-3-aminopropyl-methyl-dimethoxysilane, 1,7-bis(triethoxysilyl)-4-azaheptane, triamino-functional propyl-trimethoxysilane, 3-ureidopropyl-triethoxysilane, 3-isocyanatopropyl-triethoxysilane, tris(3-trimethoxysilylpropyl)-isocyanurate, 3-glycidyloxypropyl-N-triethoxysilylpropyl-urethane, 1-aminomethyl-triethoxysilane, 1-aminoethyl-methyl-dimethoxysilane, or mixtures thereof. Also aqueous alcohol-free aminosilanehydrosylate is included.

The polymeric and oligomeric metal-organic compounds, or polymers and oligomers of the metal-organic compounds, may be selected from polymers or oligomers of silanes, titantes, aluminates, or zirconates. The polymer or oligomer of the metal-organic compound may thus be selected from alkoxy-modified aryl/alkyl/hydrogen silsesquioxanes, alkoxy-modified aryl/alkyl/hydrogen siloxanes, alkoxy-modified aryl/alkyl/hydrogen polysiloxanes, or derivates and intermediates thereof. Polymers and oligomers of the metal-organic compound may thus be selected from methyl methoxysiloxanes, ethyl methoxysiloxanes, phenyl methoxysiloxanes, methyl ethoxysiloxanes, hydrogen methoxysiloxane, or the corresponding pre-hydrolyzed silanols, alkoxy-modified hydrogen/methyl/phenyl or vinyl silsesquioxanes, or mixtures thereof. More preferably may the polymers and oligomers of the metal-organic compounds be selected from oligomeric 3-aminopropyl-methoxy-silane, 3-aminopropyl/propyl-methoxy-silanes, N-aminoethyl-3-aminopropyl-methoxy-silanes, or N-aminoethyl-3-aminopropyl/methyl-alkoxy-silanes, 3-aminopropyl-methoxy-siloxanes, 1-amino-ethyl-methoxy-siloxanes, 3-aminopropyl/propyl-methoxy-siloxanes, N-aminoethyl-3-aminopropyl/methyl-methoxy-siloxanes, 1-aminoethyl-silsesquioxane, methoxy-terminated methyl silsesquioxane, methoxy-terminated phenyl silsesquioxane, methoxy-terminated or ethoxy-terminated aminosilsesquioxanes, such as methoxy-terminated 3-aminopropyl-silsesquioxane and methoxy-terminated 3-(2-aminoethyl)-aminopropyl-silsesquioxane, or mixtures thereof. The silsesquioxanes may be selected from closed or open silicon oxide cages, i.e. T-8, T-10, T-12, etc.

Preferably the at least one hydrolysable metal-organic compounds is chosen from 3-aminopropyl-triethoxy-silane, oligomeric 3-aminopropyl-methoxy-silane, methyl methoxysiloxane, phenyl methoxysiloxane, methoxy-terminated methylsilsesquioxane, methoxy-terminated phenyl silsesquioxane, methoxy-terminated 3-aminopropyl silsesquioxane, or methoxy-terminated 3-(2-aminoethyl)-aminopropyl silsesquioxane, or mixtures thereof.

It has been found that a very small addition of hydrolysable, metal-organic compounds, in combination with lubricants, have a surprisingly positive impact on powder and magnetic properties, such as apparent density, Hall flow rate, mould ejection force and electrical resistivity of the compacted and heat treated composite component.

The total amount of metal-organic compound(s) is 0.005-0.050%, preferably the upper limit is below 0.050%, e.g. 0.005-0.045%, 0.010-0.045%, 0.020-0.040%, or 0.020-0.035% by weight of the composition. These kinds of metal-organic compounds may be commercially obtained from companies, such as Evonik Ind., Wacker Chemie AG, Dow Corning Corp., Gelest Ltd, Mitsubishi Int. Corp., Famas Technology Sàrl, etc.

Optionally a catalyst compound may be added as a complement to the hydrolysable metal-organic compound. The catalyst compound is preferably chosen from metal-organic ethers or esters of titanates, tin or zirconates, such as tert-nbutyl-titanate.

Lubricant

The powder composition according to the invention comprises a lubricant, e.g. an oil or a solid state lubricant. Preferably the lubricant is a non-metallic, non-melt-bonded, particulate lubricant. The particulate lubricant plays an important role and enables compaction without the need of applying die wall lubrication. The particulate lubricant may be selected from the group consisting of primary and secondary fatty acid amides, fatty acid alcohols, or bisamides. The lubricating moiety of the particulate lubricant may be a saturated or unsaturated chain containing between 12-22 carbon atoms. The particulate lubricant may preferably be selected from stearamide, erucamide, stearyl-erucamide, erucyl-stearamide, behenyl alcohol, erucyl alcohol, ethylene-bisolylamide, ethylene-bisstearamide (i.e. EBS or amide wax), or methylene-bisstearamide. The lubricant may be present in an amount of 0.01-1%, or 0.01-0.6%, or 0.05-1%, or 0.05-0.6%, or 0.1-0.6%, or 0.2-0.4%, or 0.3-0.5%, or 0.2-0.6% by weight of the composition.

Preparation Process of the Composition

The process for the preparation of the ferromagnetic powder composition according to the invention comprises:

- coating soft magnetic iron-based core particles with a phosphorous-based inorganic compound to obtain a phosphorous-based inorganic insulating layer, leaving the surface of the core particles being electrically insulated.
- Optionally adding a catalyst to a hydrolysable metal-organic compound.
- Mixing the coated core particles with at least one hydrolysable metal-organic compound leaving said particles at least partially covered with said metal-organic compound, as disclosed above.
- Mixing said coated and covered core particles with a lubricant, e.g a particulate lubricant.

Process for Producing Soft-Magnetic Components

The process for the preparation of soft magnetic composite materials according to the invention comprise: uniaxially compacting the composition according to the invention in a die at a compaction pressure of at least about 600 MPa; optionally pre-heating the die, e.g. to a temperature below the melting temperature of the added particulate lubricant; optionally pre-heating the powder to between 25-100° C. before compaction; ejecting the obtained green body; and heat-treating the body at a temperature between 500-750° C. in vacuum, non-reducing, inert, or in weakly oxidizing atmospheres. The temperature of the die is important and can be used to tailor the magnetic properties, such as density, permeability and electrical resistivity. In general, higher compaction pressure can allow less (particulate) lubricant and higher die temperatures. Powders of finer particle size (e.g. 100 and 200 mesh powders) are more sensitive towards high die temperatures as compared to course powders (e.g. 40 mesh). The die temperature is preferably set to about 30-120° C., or 50-100° C., or 60-90° C., or 50-90° C., or 50-80° C.

The process of heat-treating the body may be done in air, vacuum, non-reducing, inert or in weakly oxidizing atmospheres, e.g. 0.01 to 3% oxygen. Optionally the heat treatment is performed in an inert atmosphere and thereafter exposed to an oxidizing atmosphere, such as steam, to oxidize or build a superficial crust, or layer, of higher strength. The temperature may be up to 750° C.

The heat treatment conditions shall allow the lubricant to be evaporated and the component to be stress released. Lubricant evaporation, or burn-off, is obtained during the first part of the heat treatment cycle, above about 250 to 500° C. At maximum temperature of the heat treatment cycle (500-750° C., or 520-600° C., or 530-580° C., or 530-570° C.), the compact will be stress released and thus the hysteresis loss of the composite material is reduced.

The compacted and heat treated soft magnetic composite material prepared according to the present invention preferably have a content of phosphorous of 0.01-0.15% by weight of the composite component, a content of an added metallic element chosen from the group of Si, Ti, Zr, Al to the base powder of 0.001-0.03% by weight of the component. Preferably the metallic element is Si.

Examples

It is understood that the examples and embodiments described herein are for illustrative purposes only and that various modifications or changes in light thereof will be suggested to persons skilled in the art and are to be included within the spirit and purview of this application and are considered within the scope of the appended claims. The invention is illustrated by the following examples.

Example 1

Iron-based water atomized powder having an average particle size of about 220 μm and less than 5% of the particles having a particle size below 45 μm (40 mesh powder) were further provided with an electrical insulating thin phosphorus-based layer (Somaloy®700), have been used. All samples except the reference were thereafter mixed with 0.03 wt % of liquid hydrolysable metal-organic compound consisting of methyl and phenyl methoxysiloxanes, methyl silsesquioxane, and methoxy-modified phenyl silsesquioxane. All samples were thereafter mixed with a particulate lubricant according to table 1, and thereafter moulded at 1100 MPa into toroids with an inner diameter of 45 mm, an outer diameter of 55 mm and a height of 5 mm. The tool die was pre-heated to 80° C. for the stearic acid amide (SAA) samples and to 100° C. for the EBS samples. Table 1 shows the powder properties and ejection behaviour.

TABLE 1

Ejection force as measured on OD55/ID45xH15 mm toroids.

| Sample | Fs (kN) | Fd (kN) |
|---|---|---|
| Reference (0.3 wt % SAA) | 165 | 96 |
| A1 (0.30 wt % SAA) | 150 | 99 |
| B1 (0.25 wt % SAA) | 148 | 110 |
| C1 (0.30 wt % EBS) | 142 | 80 |
| D1 (0.25 wt % EBS) | 155 | 91 |
| E1 (0.20 wt % EBS) | 164 | 96 |

The static ejection force (Fs) decrease for samples treated according to the invention. Samples A and C compared with reference show that the powder properties can be further improved with amide wax (EBS) instead of using stearic acid amide (SAA). Since the ejection behavior is improved, the amount of lubricant can be decreased in order to improve compact density and e.g. magnetic induction. Thus samples D and E show both improved or at least equal static ejection force (Fs) as well as the dynamic force (Fd) on comparison with Reference and B.

Example 2

Table 2 shows the density and magnetic properties of the 40 mesh powders that were treated according to example 1. A heat treatment process at 530° C. for 30 minutes in an atmosphere of air was performed. The specific resistivity of the obtained samples was measured by a four point measurement. For magnetic measurements the rings were wired with 100 turns for the primary circuit and 100 turns for the secondary circuit enabling measurements with the aid of a hysteresis graph (Brockhaus MPG 100).

TABLE 2

40 mesh powders.

| Sample | Ring Density (g/cm3) | Resistivity (μOhm · m) | B @ 10 kA/m (T) | $\mu_{max}$ | Core loss @ 1 T and 400 Hz (W/kg) | Core loss @ 1 T and 1 kHz (W/kg) |
|---|---|---|---|---|---|---|
| Reference (0.30 wt % SAA) | 7.63 | 85 | 1.65 | 737 | 42.9 | 139.1 |
| A2 (0.30 wt % SAA) | 7.61 | 900 | 1.63 | 563 | 40.2 | 119.2 |
| B2 (0.25 wt % SAA) | 7.64 | 580 | 1.65 | 606 | 40.2 | 120.3 |
| C2 (0.30 wt % EBS) | 7.63 | 930 | 1.63 | 575 | 40.3 | 119.3 |
| D2 (0.25 wt % EBS) | 7.65 | 690 | 1.64 | 593 | 40.0 | 118.9 |
| E2 (0.20 wt % EBS) | 7.68 | 420 | 1.67 | 621 | 39.5 | 118.1 |

As observed in table 2, the electrical resistivity of the compacts produced according to the invention is improved considerably, which in turn decrease the Eddy current losses and core loss.

Example 3

The samples were treated with hydrolysable metal-organic compounds according to example 1 and further mixed with EBS and compacted at 800 MPa using a die temperature of 80° C. Sample C and D were mixed with only 0.2% EBS and compacted at 1100 MPa using a die temperature at 100° C. The reference sample was mixed with 0.4 wt % Kenolube® and cold compacted at 800 MPa. The heat treatment for the reference samples is 530° C. for 30 min, whereas the samples according to the invention are heat treated at either 530° C. or 550° C. for 30 min according to table 3, all in an atmosphere of air. The magnetic properties were thereafter measured according to example 2.

TABLE 3

40 mesh powders.

| Measured at 1 T, 1 kHz; Sample | HT | Density (g/cc) | Resistivity (μOhm · m) | Core Loss (W/kg) | DC Loss (W/kg) | AC Loss (W/kg) |
|---|---|---|---|---|---|---|
| Reference (0.4% Kenolube ®) | 530° C. | 7.50 | 400 | 131 | 95 | 36 |

TABLE 3-continued 40 mesh powders.

| Measured at 1 T, 1 kHz; Sample | HT | Density (g/cc) | Resistivity (µOhm · m) | Core Loss (W/kg) | DC Loss (W/kg) | AC Loss (W/kg) |
|---|---|---|---|---|---|---|
| A3 (0.4% EBS) | 530° C. | 7.50 | 1200 | 128 | 95 | 33 |
| B3 (0.4% EBS) | 550° C. | 7.50 | 800 | 125 | 90 | 35 |
| C3 (0.2% EBS) | 530° C. | 7.68 | 600 | 127 | 92 | 35 |
| D3 (0.2% EBS) | 550° C. | 7.68 | 350 | 122 | 87 | 35 |

As observed in table 3, the electrical resistivity and thus the AC losses are improved considerably for A compared to the reference. Even an increase of the temperature during heat treatment allows a considerable increase in resistivity (B). This can facilitate that lower amount particulate lubricant (samples C & D) and/or higher heat treating temperatures (sample B & D) to be used, which in turn will improve density, induction and DC-loss of the resulting components. Sample D has a low addition of EBS and an increased heat treatment temperature but still manages to exhibit a resistivity not too far from that of the reference, but showing a remarkable improvement in core loss and DC loss.

Example 4

Iron-based water atomized powder having an average particle size of about 40 µm and 60% less than 45 µm (200 mesh powder), wherein the iron particles are surrounded by a phosphate-based electrically insulating coating (Somaloy®110i). The powders were thereafter treated as described in example 1 and mixed with an amount particulate lubricant according to table 4.

The samples according to the invention were mixed with EBS and compacted at 800 MPa using a die temperature at 80° C. Sample D and E were mixed with only 0.3% EBS and compacted at 1100 MPa using a die temperature at 90° C.

Sample F and G are displayed as comparative examples. Sample F was prepared in accordance with PCT/SE2009/050278, A1 table 1, with the exception that the 200 mesh powder was used and the amount of hydrolysable metal-organic compound was kept at 0.03% by weight. Sample G was prepared as sample F, but with a content of hydrolysable metal-organic compound of 0.4% by weight.

The reference sample was mixed with 0.5 wt % Kenolube® and cold compacted at 800 MPa. The heat treatment for the reference samples is 500° C. for 30 min, whereas the samples according to the invention are heat treated at between 500° C. and 550° C. for 30 min according to table 4, all in an atmosphere of air. The magnetic properties are measured according to example 2.

TABLE 4

200-mesh powders.

| | | | | Measured at 0.2 T; 10 kHz | | | |
|---|---|---|---|---|---|---|---|
| Sample | HT | Density (g/cc) | Resistivity (µOhm · m) | Core Loss (W/kg) | DC Loss (W/kg) | AC Loss (W/kg) (5 × 5 mm)* | AC Loss (W/kg) (30 × 30 mm)* |
| Reference (0.5% Kenolube ®) | 500° C. | 7.27 | 18000 | 94 | 80 | 14 | 24 |
| A4 (0.5% EBS) | 500° C. | 7.27 | 40000 | 94 | 80 | 14 | 18 |
| B4 (0.5% EBS) | 530° C. | 7.27 | 18000 | 89 | 75 | 14 | 24 |
| C4 (0.5% EBS) | 550° C. | 7.27 | 18000 | 86 | 72 | 14 | 24 |
| D4 (0.3% EBS) | 530° C. | 7.48 | 28000 | 84 | 72 | 12 | 19 |
| E4 (0.3% EBS) | 550° C. | 7.48 | 9000 | 81 | 68 | 13 | 33 |
| F4 (0.3% EBS) Comparative | 550° C. | 7.37 | 850 | 85 | 70 | 15 | 80 |
| G4 (0.3% EBS) Comparative | 550° C. | 7.34 | 3500 | 84 | 70 | 14 | 56 |

*Cross sectional area of component that carry magnetic flux.

As observed in table 4, the electrical resistivity and thus the AC losses of the compacts produced according to the invention is improved considerably when comparing reference with A. Using the same amount of EBS show that an increase in temperature (B & C) still manage to keep the resistivity above or equal to reference but with improved or equal core loss, DC-loss and AC-loss. Also less addition of EBS is disclosed resulting in good resistivity and AC-loss and lowered core loss and DC-loss. This can facilitate that less amount particulate lubricant (sample D and E) and/or higher heat treating temperatures (sample B to E) can be used, which in turn improves density, induction and DC-loss. The impact on AC-loss is clearly observed for components with a larger cross sectional area (i.e. 30×30 mm). However, increasing both temperature and lowering the lubricant amount too much may in some cases lead to decrease in resistivity and increase in AC-loss.

The results in Table 4 demonstrate that samples according to the present invention (samples A to E) have surprisingly high resistivity, density and low losses, when comparing to state of the art powders like F and G at same heat treatment temperature.

Example 5

Iron-based water atomized powder having an average particle size of about 40 µm and 60% less than 45 µm (200 mesh powder), wherein the iron particles are surrounded by a phosphate-based electrically insulating coating (Somaloy®110i). The samples were thereafter mixed with a hydrolysable metal-organic compound consisting of methyl methoxysiloxanes, methyl silsesquioxane, and oligomeric 3-aminopropyl/propyl-methoxysilane, in an amount between 0.005 and 0.070 wt % and thereafter mixed with 0.3 wt % or 0.5% EBS according to table 5. All powders according to the invention were moulded at 1100 MPa into toroids with an inner diameter of 45 mm, an outer diameter of 55 mm and a height of 5 mm. The tool die was pre-heated to 90° C. The reference sample powders 1 and 2 were moulded with Kenolube® at 800 MPa and 1100 MPa, respectively, using die temperature 60° C. The heat treatment for all samples were 530° C. for 30 min in an atmosphere of air. The specific resistivity of the obtained samples was measured by a four point measurement.

Table 5 shows the influence on powder properties and specific resistivity when the amount of hydrolysable metal-organic compound and amount of added lubricant is changed.

TABLE 5

200-mesh powders.

| Sample | Liq, Comp. (wt %) | Lubricant (wt %) | AD (g/ml) | Hall Flow (s) | Density (g/cc) | Resistivity (μOhm · m) |
|---|---|---|---|---|---|---|
| Ref 1 | No | 0.50%* | 2.98 | 25.6 | 7.25 | 7600 |
| Ref 2 | 0.030% | 0.30%* | — | No Flow | 7.48 | 540 |
| A5 | No | 0.30% | 3.30 | 30.1 | 7.56 | 820 |
| B5 | 0.003% | 0.30% | 3.27 | 30.2 | 7.54 | 2510 |
| C5 | 0.005% | 0.30% | 3.22 | 30.3 | 7.53 | 6870 |
| D5 | 0.010% | 0.30% | 3.25 | 29.9 | 7.53 | 7820 |
| E5 | 0.030% | 0.30% | 3.20 | 28.9 | 7.54 | 8520 |
| F5 | 0.030% | 0.50%** | 3.15 | 28.5 | 7.37 | 16730 |
| G5 | 0.050% | 0.30% | 3.10 | 28.1 | 7.53 | 10510 |
| H5 | 0.070% | 0.30% | — | No Flow | 7.53 | 11310 |

*Kenolube ®;

**800 MPa@80° C.

Table 5 shows that components produced with powder treated according to the invention show improved powder properties as well as considerably higher specific resistivity, as compared to references. A lower amount of lubricant is required that can facilitate higher compaction pressure, which in turn gives higher density. An insufficient amount of hydrolysable compound gives poor coating distribution and an unacceptable low specific resistivity (<0.005 wt %), see B5. Thus, according to the present invention preferred amount of hydrolysable compound is between 0.005 and 0.05 wt %.

The invention claimed is:

1. A ferromagnetic powder composition comprising an insulated iron based soft magnetic powder based on soft magnetic iron-based core particles with an apparent density between 2.8 and 4.0 g/cm$^3$, the soft magnetic iron-based core particles being irregularly shaped,
   - wherein a surface of the core particles is provided with at least one phosphorus-based inorganic insulating layer and then at least partially covered with metal-organic compound(s),
   - wherein the total amount of metal-organic compound(s) is between 0.005 and 0.05% by weight of the powder composition,
   - wherein at least one metal-organic compound is non-hydrolysable,
   - wherein at least one metal-organic compound is hydrolysable and is selected from the group consisting of alkyl alkoxy silanes, alkyl alkoxy (poly)siloxanes, alkyl alkoxy silsesquioxanes, aryl alkoxy silanes, aryl alkoxy (poly)siloxanes, aryl alkoxy silsesquioxanes, and derivatives, intermediates or oligomers thereof, wherein a central metallic atom of the hydrolysable metal-organic compound is Ti, Al, or Zr; and
   - wherein the powder composition further comprises a lubricant.

2. The ferromagnetic powder composition according to claim 1, wherein the total amount of metal-organic compound(s) is in the range of 0.010-0.045% by weight of the composition.

3. The ferromagnetic powder composition according to claim 1, wherein the lubricant is present in an amount of 0.01-1% by weight of the composition.

4. The ferromagnetic powder composition according to claim 1, wherein the lubricant is a particulate lubricant.

5. The ferromagnetic powder composition according to claim 4, wherein the particulate lubricant is selected from the group consisting of primary and secondary fatty acid amides, fatty acid alcohols, and bisamides.

6. The ferromagnetic powder composition according to claim 1, wherein the at least one hydrolysable metal-organic compound is a monomer selected from the group consisting of trialkoxy and dialkoxy-silanes, titanates, aluminates, and zirconates.

7. The ferromagnetic powder composition according to claim 1, wherein the at least one hydrolysable metal-organic compound is a polymer, or oligomer, and selected from alkyl alkoxy (poly)siloxanes or aryl alkoxy (poly)siloxanes, or derivates and intermediates thereof, or the corresponding compounds wherein the central metallic atom of the metal-organic compound is Ti, Al, or Zr.

8. The ferromagnetic powder composition according to claim 1, wherein the at least one metal-organic compound is 3-aminopropyl-triethoxy-silane, oligomeric 3-aminopropyl-methoxy-silane, methyl methoxysiloxane, phenyl methoxysiloxane, methoxy-terminated methyl silsesquioxane, methoxy-terminated phenyl silsesquioxane, methoxy-terminated 3-aminopropyl silsesquioxane, or methoxy-terminated 3-(2-aminoethyl)-aminopropyl silsesquioxane, or mixtures thereof.

9. The ferromagnetic powder composition according to claim 8, wherein the at least one metal-organic compound is oligomeric 3-aminopropyl-methoxy-silane.

10. The ferromagnetic powder composition according to claim 1, wherein the insulated iron-based soft magnetic powder having an average particle size between 10-600 μm.

11. The ferromagnetic powder composition according to claim 1, wherein the non-hydrolysable metal-organic compound content constitutes less than 95% by weight of the total amount of metal-organic compound.

12. The ferromagnetic powder composition according to claim 11, wherein the non-hydrolysable metal-organic compound content constitutes less than 80% by weight of the total amount of metal-organic compound.

13. A ferromagnetic powder composition comprising soft magnetic iron-based core particles with an apparent density between 2.8 and 4.0 g/cm$^3$,
   - wherein a surface of the core particles is provided with at least one phosphorus-based inorganic insulating layer and then at least partially covered with metal-organic compound(s),
   - wherein the total amount of metal-organic compound(s) is between 0.005 and 0.05% by weight of the powder composition,
   - wherein at least one metal-organic compound is non-hydrolysable,
   - wherein at least one metal-organic compound is hydrolysable and is selected from the group consisting of alkyl alkoxy silanes, alkyl alkoxy (poly)siloxanes, alkyl alkoxy silsesquioxanes, aryl alkoxy silanes, aryl alkoxy (poly)siloxanes, aryl alkoxy silsesquioxanes, and derivatives, intermediates or oligomers thereof, wherein a central metallic atom of the hydrolysable metal-organic compound is Ti, Al, or Zr;
   - wherein the powder composition further comprises a lubricant, wherein the metal-organic compound(s) further comprises hydrogen silsesquioxanes, aryl silsesquioxanes and/or alkyl silsesquioxanes, and wherein the non-hydrolysable metal-organic compound content constitutes less than 95% by weight of the total amount of metal-organic compound.

14. The ferromagnetic powder composition according to claim 13, wherein the non-hydrolysable metal-organic compound content constitutes less than 80% by weight of the total amount of metal-organic compound.

* * * * *